United States Patent
Yun et al.

(10) Patent No.: US 9,979,334 B2
(45) Date of Patent: May 22, 2018

(54) RIPPLE CURRENT SENSING TYPE MOTOR CONTROLLING APPARATUS AND METHOD THEREOF

(71) Applicants: HYUNDAI MOTOR COMPANY, Seoul (KR); seoyon electronics co., ltd., Ansan-si, Gyeonggi-do (KR)

(72) Inventors: Jeong Gi Yun, Seoul (KR); Dong June Song, Anyang-si (KR); Hun Joung Yoon, Suwon-si (KR); Kwan Hyung Lee, Pyeongtaek-si (KR)

(73) Assignees: HYUNDAI MOTOR COMPANY, Seoul (KR); SEOYON ELECTRICS CO., LTD., Ansan-si, Gyeonggi-Ro (KR)

( * ) Notice: Subject to any disclaimer, the term of this patent is extended or adjusted under 35 U.S.C. 154(b) by 0 days. days.

(21) Appl. No.: 15/359,137

(22) Filed: Nov. 22, 2016

(65) Prior Publication Data

US 2017/0346422 A1    Nov. 30, 2017

(30) Foreign Application Priority Data

May 24, 2016   (KR) ........................ 10-2016-0063613

(51) Int. Cl.
*H02P 3/00* (2006.01)
*H02P 7/00* (2016.01)
(Continued)

(52) U.S. Cl.
CPC .............. *H02P 7/0094* (2013.01); *H02P 7/04* (2016.02); *H02P 23/24* (2016.02)

(58) Field of Classification Search
CPC ............................... H02P 7/0094; H02P 23/24
(Continued)

(56) References Cited

U.S. PATENT DOCUMENTS

| 4,581,565 A * | 4/1986 | Van Pelt | H02P 7/04 318/294 |
| 2010/0097737 A1* | 4/2010 | Hirata | H02H 7/0816 361/101 |

(Continued)

FOREIGN PATENT DOCUMENTS

| JP | 10-23787 A | 1/1998 |
| JP | 2003-149532 A | 5/2003 |

(Continued)

OTHER PUBLICATIONS

Korean Office Action issued in corresponding Korean Patent Application No. 10-2016-0063613, dated Feb. 12, 2018, with English Translation.

*Primary Examiner* — Bentsu Ro
*Assistant Examiner* — Gabriel Agared
(74) *Attorney, Agent, or Firm* — McDermott Will & Emery LLP (57) ABSTRACT

A ripple current sensing type motor controlling apparatus includes: an H bridge circuit switched depending on at least one control; a first resistor of which one end is connected to one end of the motor through the H bridge circuit and the other end is connected to a ground; a second resistor of which one end is connected to the other end of the motor through the H bridge circuit and the other end is connected to one end of the first resistor and is connected to one end of the motor through the H bridge circuit; and a controller calculating a RPM of the motor using a voltage across the first resistor in the case in which the driving power is applied to the motor and calculating the RPM of the motor using a voltage across the second resistor in the case in which the driving power is blocked.

14 Claims, 4 Drawing Sheets

(51) Int. Cl.
*H02P 7/03* (2016.01)
*H02P 23/24* (2016.01)

(58) Field of Classification Search
USPC .......................................................... 318/490
See application file for complete search history.

(56) References Cited

U.S. PATENT DOCUMENTS

| | | | |
|---|---|---|---|
| 2013/0320890 A1 | 12/2013 | Tsukamoto et al. | |
| 2014/0028234 A1* | 1/2014 | Lee ...................... | H02P 29/027 |
| | | | 318/490 |
| 2016/0043667 A1* | 2/2016 | Aiura ....................... | H02P 8/12 |
| | | | 318/376 |

FOREIGN PATENT DOCUMENTS

| | | |
|---|---|---|
| JP | 2007-516440 A | 6/2007 |
| JP | 2010-104079 A | 5/2010 |
| JP | 2012-170249 A | 9/2012 |
| JP | 2012-191810 A | 10/2012 |
| JP | 2014-7804 A | 1/2014 |
| JP | 2014-7807 A | 1/2014 |

* cited by examiner

RIPPLE CURRENT SENSING TYPE MOTOR CONTROLLING APPARATUS AND METHOD THEREOF

CROSS-REFERENCE TO RELATED APPLICATION

This application is based on and claims the benefit of priority to Korean Patent Application No. 10-2016-0063613, filed on May 24, 2016 in the Korean Intellectual Property Office, the disclosure of which is incorporated herein in its entirety by reference.

TECHNICAL FIELD

The present disclosure relates to a technology of sensing a revolution per minute (RPM) of a motor for controlling a position, and more particularly, to a ripple current sensing type motor controlling apparatus and a method for detecting an RPM of a motor using a ripple current of the motor.

BACKGROUND

Generally, a revolution per minute (RPM) of a motor used in order to control a position within a vehicle is sensed by a sensing element such as a hall sensor, or the like. However, the hall sensor type motor sensing circuit includes the hall sensor disposed in the vicinity of the motor, such that an additional cost is required to connect a wire for controlling the hall sensor.

SUMMARY

The present disclosure has been made to solve the above-mentioned problems occurring in the prior art while advantages achieved by the prior art are maintained intact.

An aspect of the present disclosure provides a ripple current sensing type motor controlling apparatus and method capable of calculating a revolution per minute (RPM) of a motor even at the time of blocking a driving current.

An aspect of the present disclosure is not limited to the above-mentioned aspect. That is, other aspects that are not mentioned may be obviously understood by those skilled in the art from the following specification.

According to an exemplary embodiment of the present disclosure, a ripple current sensing type motor controlling apparatus includes: an H bridge circuit switched depending on at least one control signal to allow driving power to be applied to one end or the other end of a motor, thereby driving the motor in a forward direction or a reverse direction; a first resistor of which a first end is connected to the one end of the motor through the H bridge circuit and a second end is connected to a ground; a second resistor of which a first end is connected to the other end of the motor through the H bridge circuit and a second end is connected to the first end of the first resistor and is connected to the one end of the motor through the H bridge circuit; and a controller calculating a revolution per minute (RPM) of the motor based on a voltage across the first resistor in a case in which the driving power is applied to the motor and calculating the RPM of the motor based on a voltage across the second resistor in a case in which the driving power supplied to the motor is blocked.

According to another exemplary embodiment of the present disclosure provides a ripple current sensing type motor controlling method performed by a ripple current sensing type motor controlling apparatus including an H bridge circuit switched depending on at least one control signal to allow driving power to be applied to one end or the other end of a motor, thereby driving the motor in a forward direction or a reverse direction; a first resistor of which a first end is connected to the one end of the motor through the H bridge circuit and a second end is connected to a ground; a second resistor of which a first end is connected to the other end of the motor through the H bridge circuit and a second end is connected to the one end of the first resistor and is connected to the one end of the motor through the H bridge circuit; and a controller receiving first and second sensed signals which are processed voltages across the first and second resistors. The method includes: calculating an RPM of the motor based on a voltage change of the first sensed signal in a case in which the driving power is supplied to the motor; and calculating the RPM of the motor based on a voltage change of the second sensed signal in the case in which the driving power supplied to the motor is blocked.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned aspect, and other aspects, advantages, and features of the present disclosure and methods accomplishing them will become apparent from the following detailed description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Meanwhile, terms used in the present specification are for explaining exemplary embodiments rather than limiting the present disclosure. In the present disclosure, a singular form includes a plural form unless explicitly described to the contrary. Components, steps, operations, and/or elements mentioned by terms "comprise" and/or "comprising" used in the present disclosure do not exclude the existence or addition of one or more other components, steps, operations, and/or elements.

Figure 1:
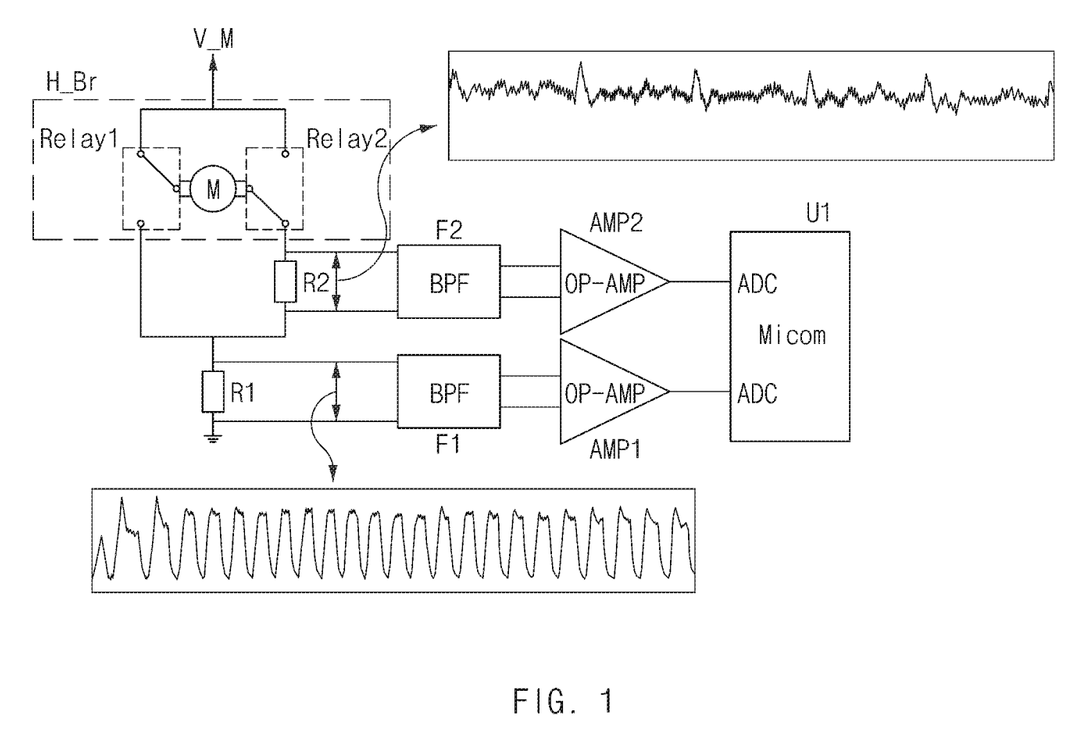
FIG. 1 is a view illustrating a configuration of a ripple current sensing type motor controlling apparatus according to an exemplary embodiment of the present disclosure.

Hereinafter, exemplary embodiments of the present disclosure will be described in detail with reference to the accompanying drawings. FIG. 1 is a view illustrating a configuration of a ripple current sensing type motor controlling apparatus according to an exemplary embodiment of the present disclosure.

As illustrated in FIG. 1, the ripple current sensing type motor controlling apparatus according to an exemplary embodiment of the present disclosure includes an H bridge circuit H_BR, first and second resistors R1 and R2, first and second filters F1 and F2, first and second amplifiers AMP1 and AMP2, and a controller U1.

The H bridge circuit H_BR is switching-controlled so that a forward or reverse current is supplied to a motor M depending on at least one control signal (first and second control signals in the present disclosure). Here, the motor M is connected to contacts (or terminals) of the H bridge circuit H_BR, and is driven in a forward direction at the time of applying the forward current from one end of the motor to the other end thereof and is driven in a reverse direction at the time of applying the reverse current from the other end of the motor to the one end thereof, in response to the one control signal applied to the H bridge circuit H_BR.

The H bridge circuit H_BR may be variously configured. However, by way of example in the present disclosure, the H bridge circuit H_BR is configured to include first and second relays Relay1 and Relay2 each having 3-intersections.

A first fixed contact of the first relay Relay1 is connected to the one end of the motor M, and second and third selection contacts thereof are connected to a driving power supply (for example battery) and a first end of the first resistor R1, respectively.

The first relay Relay1 is controlled by the first control signal to connect the one end of the motor M and the driving power supply or to connect the one end of the motor M and the first end of the first resistor R1 to each other.

For example, the first relay Relay1 may electrically connect the one end of the motor M and the driving power supply to each other in the case in which the first control signal is a threshold value or more, or electrically connect the one end of the motor M and the first end of the first resistor R1 to each other in the case in which the first control signal is less than the threshold value.

In more detail, the first relay Relay1 connects the one end of the motor M and the driving power supply V_M to each other to drive the motor M in the forward direction, or connects the one end of the motor M and the first end of the first resistor R1 to each other in other cases (to drive the motor in the reverse direction and to brake the motor) (see connection of FIG. 1).

A first fixed contact of the second relay Relay2 is connected to the other end of the motor M, and first and second selection contacts thereof are connected to the driving power supply and a first end of the second resistor R2, respectively.

The second relay Relay2 is controlled by the second control signal to connect the other end of the motor M and the driving power supply or to connect the other end of the motor M and the first end of the second resistor R2 to each other.

For example, the second relay Relay2 may connect the other end of the motor M and the driving power supply to each other in the case in which the second control signal is a threshold value or more, and connect the other end of the motor M and the first end of the second resistor R2 to each other in the case in which the second control signal is less than the threshold value.

Figure 2:
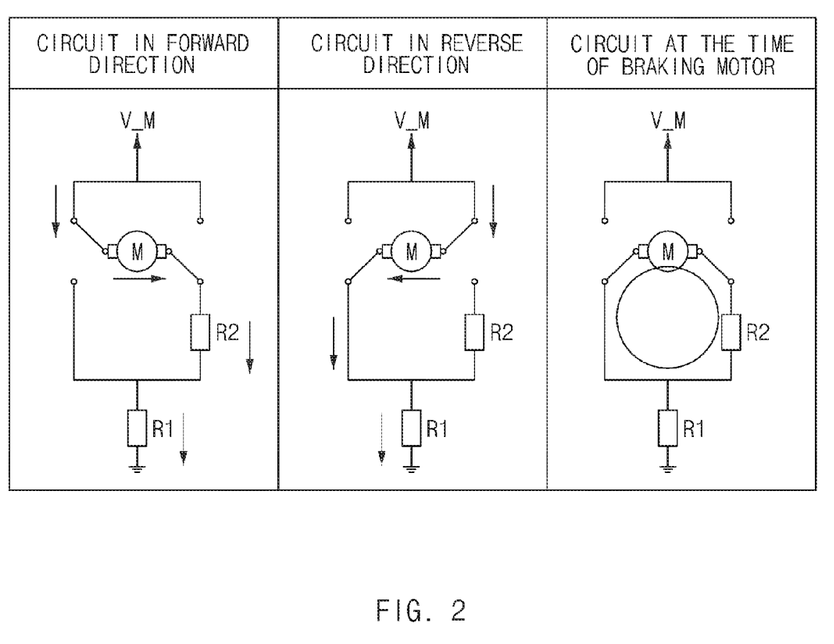
FIG. 2 is a view illustrating current directions depending on driven states of a motor according to an exemplary embodiment of the present disclosure.

In more detail, the second relay Relay2 connects the other end of the motor M and the driving power supply to each other to drive the motor in the reverse direction, or connects the other end of the motor M and the first end of the second resistor R2 to each other in other cases (to drive the motor in the forward direction and to brake the motor) (see a driving circuit in the reverse direction of FIG. 2).

The first end of the first resistor R1 is connected to the third selection contact of the first relay Relay1 and a second end of the second resistor R2, and a second end of the first resistor R1 is connected to a ground.

The first end of the second resistor R2 is connected to the third selection contact of the second relay Relay2, and the second end of the second resistor R2 is connected to the first end of the first resistor R1 and the third selection contact of the first relay Relay1.

It is preferable that the first and second resistors R1 and R2 are resistors having a low error rate in order to improve accuracy of detection of a revolution per minute (RPM) of the motor. For example, the error rate may be 0.1%.

In addition, it is preferable that the first and second resistors R1 and R2 have a low resistance value (for example, 0.5Ω or less) so as not to hinder a current flowing to the motor M.

The first filter F1 removes noise of a first voltage, which is a voltage across the first resistor R1.

The second filter F2 removes noise of a second voltage, which is a voltage across the second resistor R2.

For example, the first and second filters F1 and F2 may be a band pass filter passing only a frequency band of a ripple generated in the motor M that is driven therethrough. There, the frequency band of the ripple may be determined depending on operation characteristics of the motor M.

The first amplifier AMP1 outputs a first sensed signal as a result of amplifying the first voltage of which the noise is removed at a first amplifying rate.

Here, the first amplifying rate is set so that the first sensed signal is in a range in which it may be sensed by the controller in the case in which driving power is supplied to the motor M.

The second amplifier AMP2 outputs a second sensed signal as a result of amplifying the second voltage of which the noise is removed at a second amplifying rate higher than the first amplifying rate.

Here, the second amplifying rate may be set so that the second sensed signal is in a range in which it may be sensed by the controller in the case in which the driving power is applied and then blocked.

For example, the first and second amplifiers AMP1 and AMP2 may be an operational amplifier OP AMP amplifying an analog signal.

The controller U1 controls the H bridge circuit H_BR by the first and second control signals to supply the forward current or the reverse current to the motor M or brake the motor M.

In detail, the controller U1 outputs the first and second control signals depending on a user's manipulation level and manipulation state for a switch corresponding to the motor M. Therefore, the controller U1 controls the selection contacts of the first and second relays Relay1 and Relay2 to drive the motor M in the forward direction or the reverse direction.

The controller U1 calculates an RPM of the motor using the first sensed signal at the time of applying the driving power to the motor, and calculates the RPM of the motor using the second sensed signal at the time of blocking the driving power applied to the motor.

In addition, since the controller U1 controls a driving direction of the motor depending on a manipulation state of the switch (not illustrated) at the time of applying the driving power to the motor, the controller may calculate an RPM of the motor in the driving direction of the motor corresponding to the manipulation state of the switch (not illustrated).

However, in the case in which the driving power is applied to the motor M and is then blocked, that is, at the time of braking the motor of FIG. 2, the motor M may maintain a rotation direction at the time of applying the driving power (over-run) or may be driven in the reverse direction (back spin).

Therefore, the controller U1 may confirm whether the motor M is in an over-run state or in a back spin state using a waveform of the second sensed signal at the time of blocking the driving power supplied to the motor M, and calculate the RPM of the motor by further using a decision result.

In detail, when the motor M is in the over-run state, the controller U1 may increase the RPM of the motor calculated using the first sensed signal before the driving power is blocked depending on the second sensed signal, thereby detecting a total RPM of the motor.

On the other hand, when the motor M is in the back spin state, the controller U1 may decrease the RPM of the motor calculated using the first sensed signal before the driving power is blocked.

The controller U1 may calculate the RPM of the motor in consideration of a driving direction of the motor until the driving of the motor M is stopped.

Here, the controller U1 may calculate the RPM of the motor in consideration of the driving direction of the motor until a ripple period may not be detected from the second sensed signal. In more detail, the controller U1 may use Vpp of the second sensed signal to calculate the RPM of the motor only when the Vpp of the second sensed signal is a preset threshold value or more.

The controller U1 described above may calculate the RPM of the motor by counting preset periods of the first and second sensed signals as 1 revolution of the motor. For example, in the case in which the number of slots of a commutator of the motor is 8, the controller U1 may count eight periods of the first or second sensed signal as 1 revolution of the motor.

In addition, the controller U1, which is a microcomputer Micom including ADC (analog-to-digital conversion) ports, may receive the first and second sensed signals input through the ADC ports, and confirm voltage changes and waveforms of the first and second sensed signals.

Meanwhile, the case in which the controller U1 performs both of the switching-control of the H bridge circuit H_BR and the calculation of the RPM of the motor has been described by way of example in the exemplary embodiment described above. Alternatively, the controller U1 may calculate only the RPM of the motor, and the switching-control of the H bridge circuit H_BR may be performed by another component.

As described above, in the present disclosure, the RPM of the motor is counted at the time of blocking the power applied to the motor as well as at the time of applying the power to the motor. Therefore, the RPM of the motor may be more accurately detected.

Furthermore, since another circuit member other than a wire connected to the motor may be included in a motor controlling unit of a vehicle body in an exemplary embodiment of the present disclosure, a connection structure for sensing the motor may be significantly simplified. As a result, a cost required for implementing a motor sensing module may be lowered.

Hereinafter, a current direction for each driven state of a motor will be described with reference to FIG. 2. FIG. 2 is a view illustrating current directions depending on driven states of a motor according to an exemplary embodiment of the present disclosure.

First, to rotate the motor in the forward direction, the first relay Relay1 connects the one end of the motor M and the driving power supply to each other, depending on a control of the controller U1. Meanwhile, the second relay Relay2 connects the other end of the motor M and the second resistor R2 to each other, depending on a control of the controller U1. Therefore, a driving current flows from the one end of the motor M to the other end of the motor M, that is, in the forward direction of the motor M, and then flows to the ground through the second resistor R2 and the first resistor R1.

Second, to rotate the motor in the reverse direction, the first relay Relay1 connects the one end of the motor M and a node connected to the first end of the first resistor R1 and the second end of the second resistor R2 to each other, and the second relay Relay2 connects the other end of the motor M and the driving power supply to each other, depending on a control of the controller U1. Therefore, a driving current flows from the other end of the motor M to the one end of the motor M, that is, in the reverse direction of the motor M, and then flows to the ground through the first resistor R1.

Third, to brake the motor, the first relay Relay1 connects the one end of the motor M and the node connected to the second end of the second resistor R2 and the first end of the first resistor R1 to each other. Meanwhile, the second relay Relay2 connects the other end of the motor M and the first end of the second resistor R2 to each other, depending on a control of the controller U1. Therefore, even after the driving power is blocked, a current remaining in the motor flows in a clockwise direction or a counterclockwise direction depending on characteristics of the motor in a closed loop circuit connecting the one end of the motor M, the second resistor R2, and the other end of the motor M to each other.

Therefore, in the present disclosure, when the motor M is driven in the forward direction or the reverse direction, the current flowing to the motor M, that is, the RPM of the motor may be measured through the voltage across the first resistor R1.

In addition, in the present disclosure, when the motor M is braked, the current flowing to the motor M, that is, the RPM of the motor may be measured through the voltage across the second resistor R2.

Hereinafter, a voltage across the motor at the time of driving the motor in the forward direction and first and second sensed signals according to an exemplary embodiment of the present disclosure will be described with reference to FIG. 3. (FIG. 3 shows graphs (a)-(c) respectively illustrating a voltage across the motor M, a first sensed signal, and a second sensed signal according to an exemplary embodiment of the present disclosure.

The motor M generates a fine ripple by contact between a commutator and a brush at the time of rotation thereof.

This will be described in detail with reference to FIG. 3. The voltage across the motor M is slightly irregular when the motor M starts to be driven (see Start of (a) to (c) of FIG. 3), but has a form of a sinusoidal wave that is relatively regular at a point in time at which the motor M is stably operated (see Normal of (a) to (c) of FIG. 3). However, the voltage across the motor M is further generated, gradually becomes small, and is then converged to 0V after the driving power is blocked.

Figure 3:
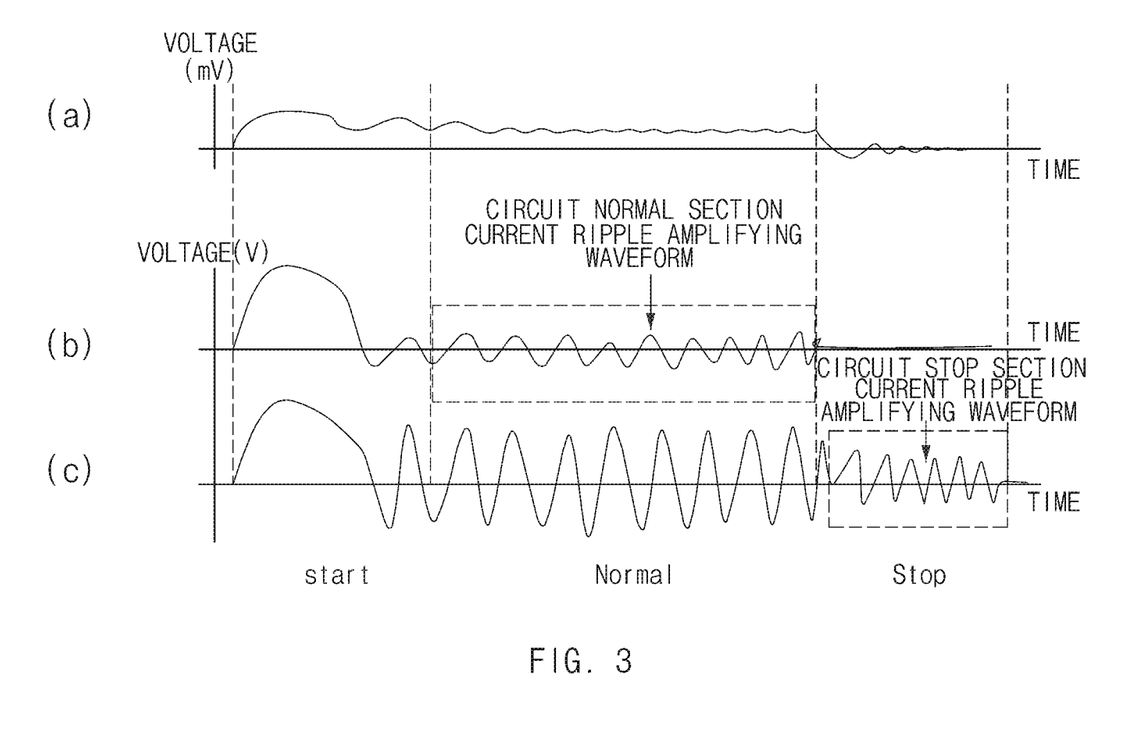
FIG. 3 shows graphs (a)-(c) illustrating a voltage across a motor, and first and second sensed signals according to an exemplary embodiment of the present disclosure, respectively.

However, since the voltage across the motor has a very small ripple in several mV unit, the controller U1 confirms the RPM of the motor using the first and second sensed signals amplified after the noise is removed from the first and second sensed signals as illustrated in (b) and (c) of FIG. 3 in order to more accurately confirm the ripple.

As illustrated in (b) of FIG. 3, when the motor is driven in the forward direction, the first sensed signal indicates comparatively constant periodicity at the time of a normal operation of the motor M, and becomes 0V since a current does not flow to the first resistor R1 at the time of braking the motor M.

As illustrated in (c) of FIG. 3, when the motor is driven in the forward direction, the second sensed signal is amplified at an amplifying rate (the second amplifying rate) higher than that of the first sensed signal. Thus, Vpp of the second sensed signal is relatively large at the time of the normal operation of the motor, but is decreased at the time of braking the motor M.

At this point, Vpp of the second sensed signal may also be out of a range in which it may be sensed by the controller U1 when the motor is driven in the forward direction. However, the second amplifying rate may be set so that the second sensed signal moves in a range in which it may be sensed by the controller U1 at the time of braking the motor.

Therefore, the controller U1 may also decide that the motor M is in a braked state in the case in which Vpp of the second sensed signal may be sensed separately from outputs of the first and second control signals.

Figure 4:
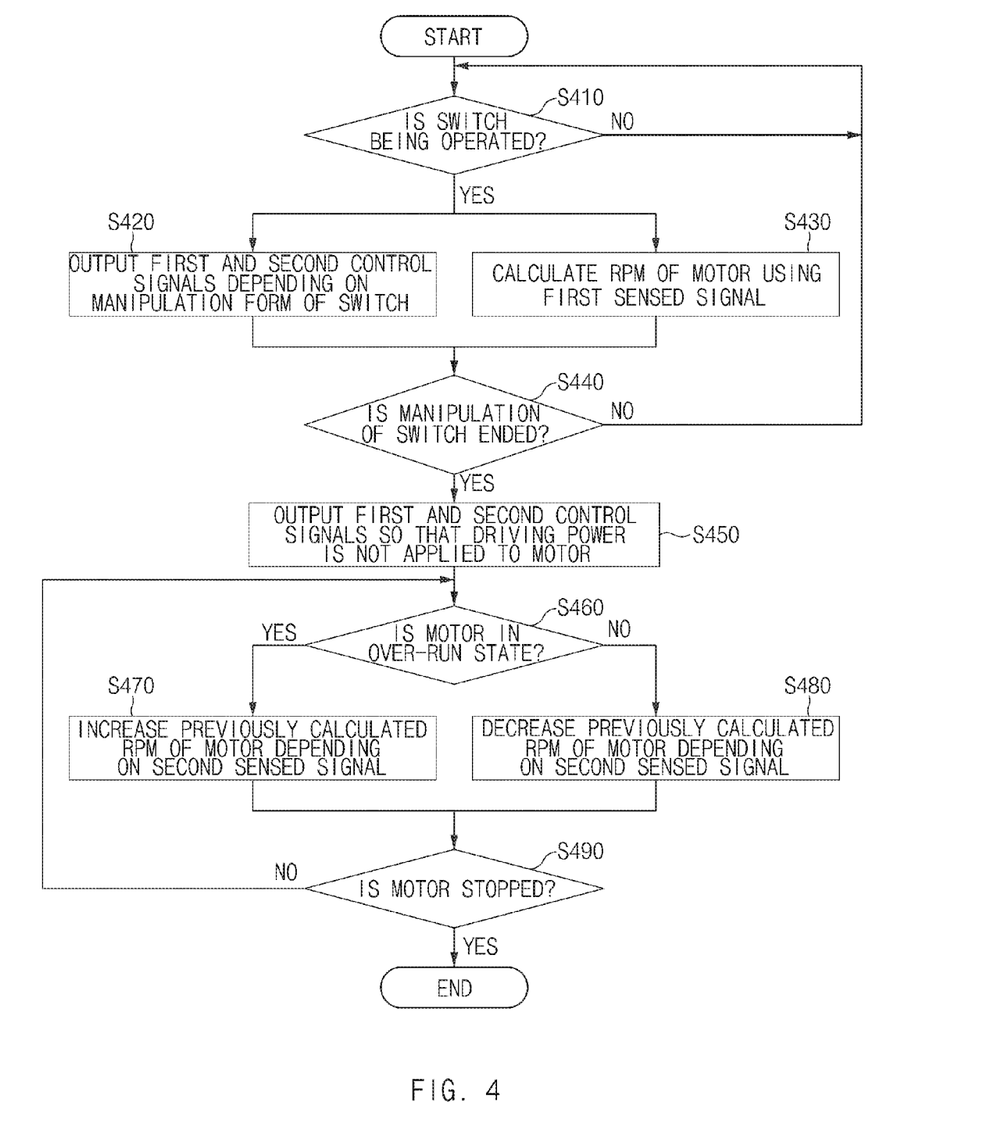
FIG. 4 is a flow charting illustrating a ripple current sensing type motor controlling method according to an exemplary embodiment of the present disclosure.

Hereinafter, a ripple current sensing type motor controlling method according to an exemplary embodiment of the present disclosure will be described with reference to FIG. 4. FIG. 4 is a flow charting illustrating a ripple current sensing type motor controlling method according to an exemplary embodiment of the present disclosure.

Referring to FIG. 4, when the controller U1 confirms that a switch is being manipulated by a user (Yes of S410), the controller U1 outputs the first and second control signals controlling the first and second relays Relay1 and Relay2 so as to supply the forward or reverse current to the motor M depending on a switch manipulation form (S420).

In addition, the controller U1 calculates the RPM of the motor sensing a voltage change of the first sensed signal (S430). In detail, the controller U1 may calculate the RPM of the motor by counting a preset period of the first sensed signal as 1 revolution of the motor M.

When it is confirmed that the manipulation of the switch by the user is ended (Yes of S440), the controller U1 outputs the first and second control signals so that the selection contacts of the first and second relays Relay1 and Relay2 are not connected to the driving power supply (S450).

The controller U1 confirms whether the motor is in the over-run state or the back spin state by a waveform of the second sensed signal (S460).

When the motor is in the over-run state as a confirmation result, that is, when the motor maintains the previous driving direction, the controller U1 increases a total RPM of the motor sensed before operation power is blocked depending on the second sensed signal (S470).

On the other hand, when the motor M is in the back spin state, that is, when the motor M is driven in the reverse direction to the previous driving direction, the controller U1 decreases the RPM of the motor sensed before the driving power is blocked depending on the second sensed signal (S480).

The controller U1 calculates the RPM of the motor by increasing or decreasing the RPM of the motor in consideration of the driving direction of the motor (S460 to S480) until the RPM of the motor may not be sensed any more by the second sensed signal (Yes of S490).

As described above, in the present disclosure, the RPM of the motor is counted at the time of blocking the power applied to the motor as well as at the time of applying the power to the motor. Therefore, the RPM of the motor may be more accurately detected.

Furthermore, since another circuit member other than a wire connected to the motor may be included in a motor controlling unit of a vehicle body in an exemplary embodiment of the present disclosure, a connection structure for sensing the motor may be significantly simplified. As a result, a cost required for implementing a motor sensing module may be lowered.

As described above, according to the exemplary embodiments of the present disclosure, the RPM of the motor may be detected even at the time of blocking the driving power.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A ripple current sensing type motor controlling apparatus comprising:
   an H bridge circuit switched depending on at least one control signal to allow driving power to be applied to one end or the other end of a motor, thereby driving the motor in a forward direction or a reverse direction;
   a first resistor of which a first end is connected to the one end of the motor through the H bridge circuit and a second end is connected to a ground;
   a second resistor of which a first end is connected to the other end of the motor through the H bridge circuit and a second end is connected to the first end of the first resistor and is connected to the one end of the motor through the H bridge circuit; and
   a controller calculating a revolution per minute (RPM) of the motor based on a voltage across the first resistor in a case in which the driving power is applied to the motor and calculating the RPM of the motor based on a voltage across the second resistor in a case in which the driving power supplied to the motor is blocked,
   wherein the controller receives first and second sensed signals which are processed voltages across the first and second resistors, respectively,
   confirms whether the second sensed signal has a back spin waveform or an over-run waveform,
   increases the RPM of the motor calculated before the driving power is blocked depending on the second sensed signal upon confirmation that the second sensed signal has the over-run waveform, and
   decreases the RPM of the motor calculated before the driving power is blocked depending on the second sensed signal upon confirmation that the second sensed signal has the back spin waveform.

2. The ripple current sensing type motor controlling apparatus according to claim 1, wherein in response to a detection that a switch for manipulating the motor is manipulated, the controller or another controller outputs the at least one control signal depending on a manipulation level or manipulation form of the switch to allow the driving power to be applied from the one end of the motor to the other end thereof through the H bridge circuit, thereby driving the motor in the forward direction, or to allow the driving power to be applied from the other end of the motor to the one end thereof through the H bridge circuit, thereby driving the motor in the reverse direction.

3. A ripple current sensing type motor controlling apparatus comprising:
an H bridge circuit switched depending on at least one control signal to allow driving power to be applied to one end or the other end of a motor, thereby driving the motor in a forward direction or a reverse direction;
a first resistor of which a first end is connected to the one end of the motor through the H bridge circuit and a second end is connected to a ground;
a second resistor of which a first end is connected to the other end of the motor through the H bridge circuit and a second end is connected to the first end of the first resistor and is connected to the one end of the motor through the H bridge circuit;
a controller calculating a revolution per minute (RPM) of the motor based on a voltage across the first resistor in a case in which the driving power is applied to the motor and calculating the RPM of the motor based on a voltage across the second resistor in a case in which the driving power supplied to the motor is blocked;
first and second filters respectively removing noise of first and second voltages which are the voltages across the first and second resistors; and
first and second amplifiers transferring first and second sensed signals generated by amplifying the first and second voltages of which the noise is removed at first and second amplifying rates, respectively, to the controller.

4. The ripple current sensing type motor controlling apparatus according to claim 3, wherein the first amplifying rate is set to a first value so that the first sensed signal is in a range in which the first sensed signal is sensed by the controller in a case in which the driving power is supplied to the motor, and
the second amplifying rate is set to a second value greater than the first value so that the second sensed signal is in a range in which the second sensed signal is sensed by the controller in a case in which the driving power is applied and then blocked.

5. The ripple current sensing type motor controlling apparatus according to claim 1, wherein the controller calculates the RPM of the motor by counting a preset period of the voltage across the first or second resistor as 1 revolution of the motor.

6. The ripple current sensing type motor controlling apparatus according to claim 1, wherein the controller decides whether a driving direction of the motor is the forward direction or the reverse direction based on a waveform of the voltage across the second resistor when the driving power is applied and then blocked, and increases or decreases the RPM of the motor calculated before the driving power is blocked depending on the voltage across the second resistor based on a decision result, thereby calculating a total RPM of the motor.

7. The ripple current sensing type motor controlling apparatus according to claim 1, wherein in response to a detection that manipulation of a switch for manipulating the motor is ended, the controller or another controller controls the H bridge circuit so that the one end of the motor is connected to the first end of the first resistor and the second end of the second resistor and the other end of the motor is connected to the first end of the second resistor.

8. The ripple current sensing type motor controlling apparatus according to claim 1, wherein the controller calculates the RPM of the motor in a driving direction corresponding to the at least one control signal in the case in which a forward current or a reverse current is supplied by the driving power to the motor.

9. A ripple current sensing type motor controlling method by a ripple current sensing type motor controlling apparatus including an H bridge circuit switched depending on at least one control signal to allow driving power to be applied to one end or the other end of a motor, thereby driving the motor in a forward direction or a reverse direction; a first resistor of which a first end is connected to the one end of the motor through the H bridge circuit and a second end is connected to a ground; a second resistor of which a first end is connected to the other end of the motor through the H bridge circuit and a second end is connected to the first end of the first resistor and is connected to the one end of the motor through the H bridge circuit; and a controller receiving first and second sensed signals which are processed voltages across the first and second resistors, respectively, the method comprising:
calculating an RPM of the motor based on a voltage change of the first sensed signal in a case in which the driving power is supplied to the motor; and
calculating the RPM of the motor based on a voltage change of the second sensed signal in a case in which the driving power supplied to the motor is blocked,
wherein the calculating the RPM of the motor based on a voltage change of the second sensed signal includes:
confirming whether the second sensed signal has a back spin waveform or an over-run waveform;
increasing the RPM of the motor calculated before the driving power is blocked depending on the second sensed signal upon confirmation that the second sensed signal has the over-run waveform; and
decreasing the RPM of the motor calculated before the driving power is blocked depending on the second sensed signal upon confirmation that the second sensed signal has the back spin waveform,
wherein the confirming of whether the second sensed signal has the back spin waveform or the over-run waveform, the increasing, and the decreasing are continued until the motor is stopped.

10. A ripple current sensing type motor controlling method by a ripple current sensing type motor controlling apparatus including an H bridge circuit switched depending on at least one control signal to allow driving power to applied to one end or the other end of a motor, thereby driving the motor in a forward direction or a reverse direction; a first resistor of which a first end is connected to the one end of the motor through the H bridge circuit and a second end is connected to a ground; a second resistor of which a first end is connected to the other end of the motor through the H bridge circuit and a second end is connected to the first end of the first resistor and is connected to the one end of the motor through the H bridge circuit; and a controller receiving first and second sensed signals which are processed voltages across the first and second resistors, respectively, the method comprising:
calculating an RPM of the motor based on a voltage change of the first sensed signal in a case in which the driving power is supplied to the motor; and
calculating the RPM of the motor based on a voltage change of the second sensed signal in a case in which the driving power supplied to the motor is blocked, wherein the calculating of the RPM of the motor based on the voltage change of the second sensed signal includes:
confirming whether manipulation of a switch driving the motor in the forward direction or the reverse direction is ended;
controlling the H bridge circuit so that both ends of the motor and the second resistor form a closed loop upon confirmation that the manipulation of the switch is ended; and
calculating the RPM of the motor in consideration of a waveform of the second sensed signal.

11. The ripple current sensing type motor controlling method according to claim 10, wherein calculating the RPM of the motor based on a voltage change of the second sensed signal,
wherein the confirming of whether the second sensed signal has the back spin waveform or the over-run waveform, the increasing, and the decreasing are continued until the motor is stopped.

12. The ripple current sensing type motor controlling method according to claim 9, wherein in the calculating of the RPM of the motor based on the voltage change of the first sensed signal, the RPM of the motor in a driving direction corresponding to the at least one control signal is calculated.

13. The ripple current sensing type motor controlling method according to claim 9, wherein in the calculating of the RPM of the motor based on the voltage change of the first sensed signal, the RPM of the motor is calculated by counting a preset period of the voltage across the first or second resistor as 1 revolution of the motor.

14. The ripple current sensing type motor controlling method according to claim 9, wherein the calculating of the RPM of the motor based on the voltage change of the first sensed signal includes:
confirming a manipulation level and manipulation form of a switch for manipulating the motor in response to a detection that the switch is manipulated; and
outputting the at least one control signal depending on the manipulation level and manipulation form to allow the driving power to be applied from the one end of the motor to the other end thereof through the H bridge circuit, thereby driving the motor in the forward direction, or to allow the driving power to be applied from the other end of the motor to the one end thereof, through the H bridge circuit thereby driving the motor in the reverse direction.

* * * * *